United States Patent [19]

Schull et al.

[11] 3,828,313

[45] Aug. 6, 1974

[54] METHOD AND APPARATUS FOR DATA TRANSMISSION

[75] Inventors: Robert D. Schull, Mission Viejo; Richard Y. Ichinose, Placentia, both of Calif.

[73] Assignee: American Multiplex Systems, Inc., Anaheim, Calif.

[22] Filed: Sept. 12, 1972

[21] Appl. No.: 288,414

Related U.S. Application Data

[63] Continuation-in-part of Ser. No. 182,688, Sept. 22, 1971, abandoned.

[52] U.S. Cl. ..... 340/147 SY, 340/163 R, 340/151 R

[51] Int. Cl. ........ H04q 11/00

[58] Field of Search ...... 340/163 R, 147 SY, 150 R, 340/151 R

[56] References Cited

UNITED STATES PATENTS

| | | | |
|---|---|---|---|
| 3,016,516 | 1/1962 | Doersam | 340/147 SY |
| 3,098,215 | 7/1963 | Waite | 340/151 R |
| 3,340,508 | 9/1967 | Petitt | 340/163 X |
| 3,510,841 | 5/1970 | Lejon | 340/151 R |
| 3,516,063 | 6/1970 | Arkin | 340/151 X |

*Primary Examiner*—Harold I. Pitts
*Attorney, Agent, or Firm*—Harris, Kern, Wallen & Tinsley

[57] ABSTRACT

Method and apparatus for multiplex data transmission wherein binary address messages in a first waveform are transmitted from a central station through a data line to a plurality of remote terminals and binary response messages indicating the status of parameter points at the remote terminal are transmitted in a second waveform from the remote terminals through the same data line to the central station or other remote terminals. Remote receiver means are provided for differentiating between the two binary message waveforms. A clock signal is generated at the central station for transmission through a clock line to the remote terminals to provide synchronous circuit operation and a power supply for the remote terminals.

18 Claims, 8 Drawing Figures

REMOTE TERMINAL

TIMING DIAGRAM

METHOD AND APPARATUS FOR DATA TRANSMISSION

This is a continuation-in-part of our copending application Ser. No. 182,688 filed on Sept. 22, 1971, and now abandoned and also entitled "Method and Apparatus For Data Transmission."

This invention relates generally to multiplex digital data transmission systems, and particularly to a system incorporating a central station connected through three lines to a plurality of remote terminals for monitoring parameter points at remote input terminals and for controlling parameter points at remote output terminals.

The general advantages of multiplex digital data transmission systems are discussed in Reprint No. 949 from "Control Engineering" written by Richard L. Aronson and entitled "Line-Sharing Systems for Plant Monitoring and Control" and include the capability of monitoring and controlling thousands of parameter points through shared lines connecting each of the points with a central station, thereby substantially eliminating wire costs and cable congestion. However, many of the prior art systems of this character are unduly expensive, complicated, and inefficient, and sometimes prone to inaccuracies.

Accordingly, it is a primary object of the present invention to take advantage of the operational benefits inherent in a multiplex system while at the same time providing a simplified, inexpensive, accurate, efficient, and flexible method and apparatus to achieve automated monitoring of discrete inputs and controlling of outputs in heating and air conditioning systems, security systems, fire detection systems, process monitoring and control systems, pollution monitoring and control systems, medical monitoring and control, and the like.

The most recent prior art multiplex data transmission system with which we are familiar is disclosed in patent application Ser. No. 176,228, filed on or about Aug. 30, 1971, entitled METHOD AND APPARATUS FOR DATA TRANSMISSION, which application was assigned to the assignee of the present application. This prior art system provides for control and monitoring of analog and discrete parameter points at a plurality of remote terminals, and has many advantages over previous multiplex data transmission systems. Nevertheless, such prior art is unduly restrictive for purposes of monitoring discrete inputs and controlling outputs, since among other things it requires an independent power supply at each remote terminal, a two-wire line for carrying binary messages from the central station, a separate two-wire line for carrying binary response messages back to the central station, and another two-wire line for carrying a clock signal to the remote terminals, and since it incorporates the three two-wire lines into a single trunk for connecting to the remote terminals.

Accordingly, it is another primary object of the present invention to adapt and improve the aforementioned prior art data transmission system for monitoring discrete input parameter points and controlling output parameter points by providing a multi-branch three conductor cable connecting remote terminals with the central station, including a data line for transmitting binary messages to and from the central station as well as between remote terminals, a clock line to assure bit synchronization at the remote terminals and to supply power to the remote terminals, and a ground line for providing a ground reference for the central station and remote terminals.

More specifically, it is an object of the present invention to provide a method and apparatus of the foregoing character for sequentially and randomly monitoring a plurality of discrete input parameter points and controlling a plurality of output parameter points at various remote terminals by transmitting a binary address message from a central station through a data line in a waveform discernible by the remote terminals, and transmitting a binary response message from the addressed remote input terminal through the same data line to the central station and other identically addressed output remote terminals in a waveform not discernible by the other non-addressed remote terminals. A related object is to provide out-of-phase data signals coupled to a remote receiver circuit for decoding a binary address message in biphase waveform and for ignoring a binary response message in non-return-to-zero (NRZ) waveform.

Another specific object is to provide a system of the foregoing character which includes an address detector circuit in each remote terminal which upon receipt of its own uniquely coded binary address message activates a programmer circuit to operate successively through a reset pulse mode, a scan pulse mode, and a transmitter pulse mode to enable an addressed input terminal to scan parameter points and transmit a binary response message indicating the status of its parameter points as well as enable an addressed output terminal to receive such binary response message.

A further object is to provide a system of the foregoing character having an expandable number of parameter points and remote terminals and wherein an increase in parameter points in the remote terminals also increases the number of available terminals capable of being identified by a unique address.

Still another object is to provide a system of the foregoing character having remote input terminals with scanning circuit means for sensing the status of normally closed and normally open switch sensors at each parameter point, and having a verification circuit for generating a coded signal after all of the parameter points have been scanned.

An additional object is to provide a system of the foregoing character which uses standard wire for sensors and conductors, and which incorporates synchronous circuit elements which operate over a large voltage range, thereby enabling relatively long distance transmission of binary messages while minimizing noise susceptibility and the possibility of accidental message transmission and false alarms.

A further object is to provide a system of the foregoing character having low cost, small sized remote terminals which can be thrown away whenever random failure occurs within the electronics of the remote terminal, thereby eliminating the need for maintenance of the remote terminals.

Further purposes, objects, features, and advantages of the invention will be evident to those skilled in the art from the following description of a preferred embodiment of the invention.

Figure 1:
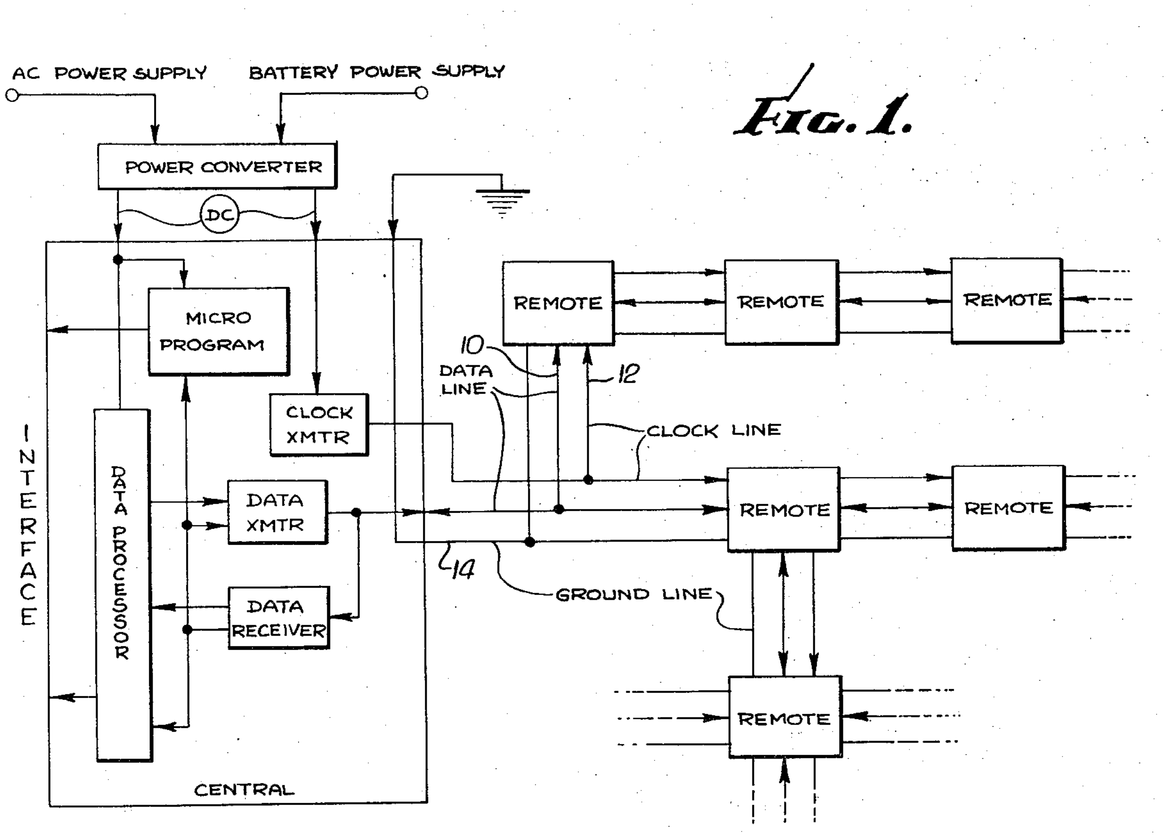
FIG. 1 is a block diagram showing a multiplex digital data transmission system incorporating a presently preferred embodiment of the invention.

Generally speaking, the invention provides a method of transmitting digital data between a central station and a plurality of remote terminals and/or from a remote input terminal to a remote output terminal, and utilizes time-shared multiplexing of the transmission lines connecting them. Binary address messages are initiated at the central station, and are transmitted in a first waveform through a data line 10 to each of the remote terminals. The addressed remote input terminal then scans its parameter points to sense their status, and generates a binary response message which is transmitted in a second waveform through the same data line 10 to the central station. Such binary response message is also received and decoded by the remote output terminal having an address identical to the addressed input terminal, thereby enabling active control over parameters in addition to passive monitoring thereof. If the response message received by the central station indicates a need for further immediate monitoring of any parameter point at a remote terminal, repeated binary address messages can be initiated manually or by predetermined program to that same destination or to any other destination, thus providing random access to the various parameter points in the system. Otherwise, the system usually provides for repeated sequential scanning of all input parameter points in the system, and/or sequential control of all output parameter points.

Since the remote terminals employ active synchronous circuitry, a clock line 12 transmits a clock signal associated with the binary control message from the central station to the remote terminals to assure proper bit synchronization and to provide a power supply at the remote terminals. A third line 14 provides a common reference ground for the central station and remote terminals.

Three out-of-phase clock signals are generated from the clock line 12 at each remote terminal for use in clocking various circuit elements in the synchronous digital circuits of the remote terminals. In this regard, binary address messages are received and decoded by each remote terminal, while binary response messages on the same data line 10 are ignored by those remote terminals not specifically addressed and not in the control configuration. When a remote terminal detects its own binary address message, the addressed input terminal is activated to initiate the previously described process of scanning parameter points and transmitting a binary response message while the addressed output terminal is activated to scan the data line and decode such binary response message.

Thus, the invention contemplates using a single data line to transmit coded messages to a remote input terminal, a remote output terminal and/or a central station with the assurance that such message will be received and decoded only at its predetermined destination.

With certain maximum capabilities of a particular embodiment, it is possible to add or delete remote terminals and/or parameter points without interfering with the normal operation and circuitry of the system. In this regard, each of the remote terminals is attached by party-line connection to any branch of a three-conductor transmission circuit which includes the data line 10, the clock line 12, and the ground line 14, thus assuring optimum system flexibility and enabling each remote terminal to operate independently.

Referring more particularly to FIG. 1, the central station includes an interface for either a computer, console or the like, and in the illustrated form incorporates a micro program for controlling the sequence of scanning and for properly encoding each binary address message initiated at the central station. A data processor is provided in the central station, and is used for receiving and processing the binary response messages. The system operates on a conventional alternating current power supply which is converted to direct current before being utilized for operation of the micro program and data processor, and for initiating a binary address message signal through the data line 10 and a corresponding clock signal along the clock line 12.

A supplementary battery power supply is connected to the central station to assure operation of the system should a power failure occur.

Figure 2:
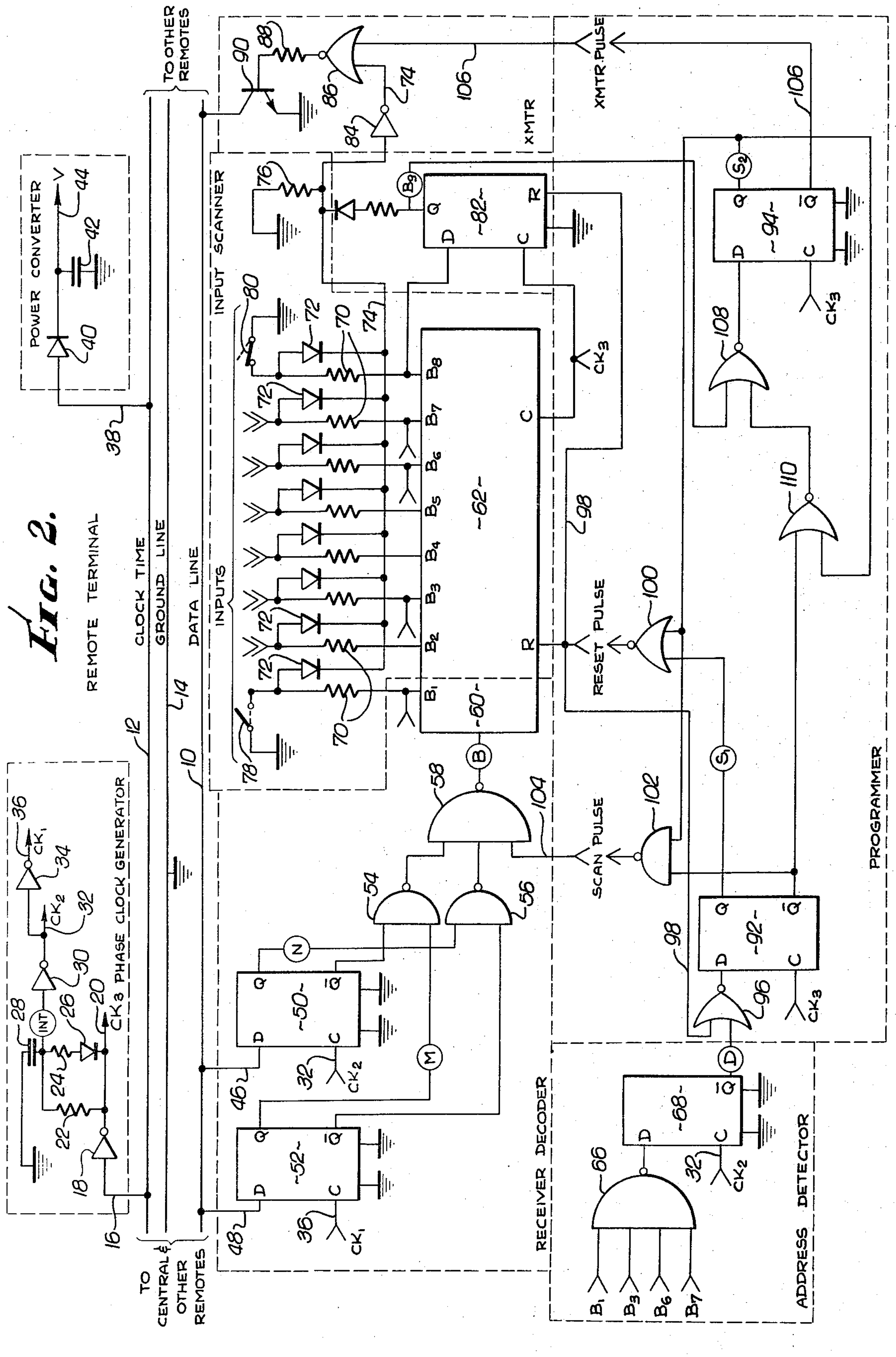
FIG. 2 is a circuit diagram of a remote input terminal of FIG. 1.

Referring now to FIG. 2, each remote terminal includes a phase clock generator for generating from the clock line 12 a plurality of out-of-phase clock signals, such as CK1, CK2 and CK3 of the preferred embodiment. A phase clock generator line 16 connects through an inverter 18 to a line 20 carrying a CK3 clock signal 180° out of phase with the main clock signal carried on the clock line 12. An integrating circuit such as resistors 22, 24, diode 26 and capacitor 28 are connected between an inverter 30 and the CK3 line 20 to produce a CK2 signal on a line 32 at the output of inverter 30.

Figure 3:
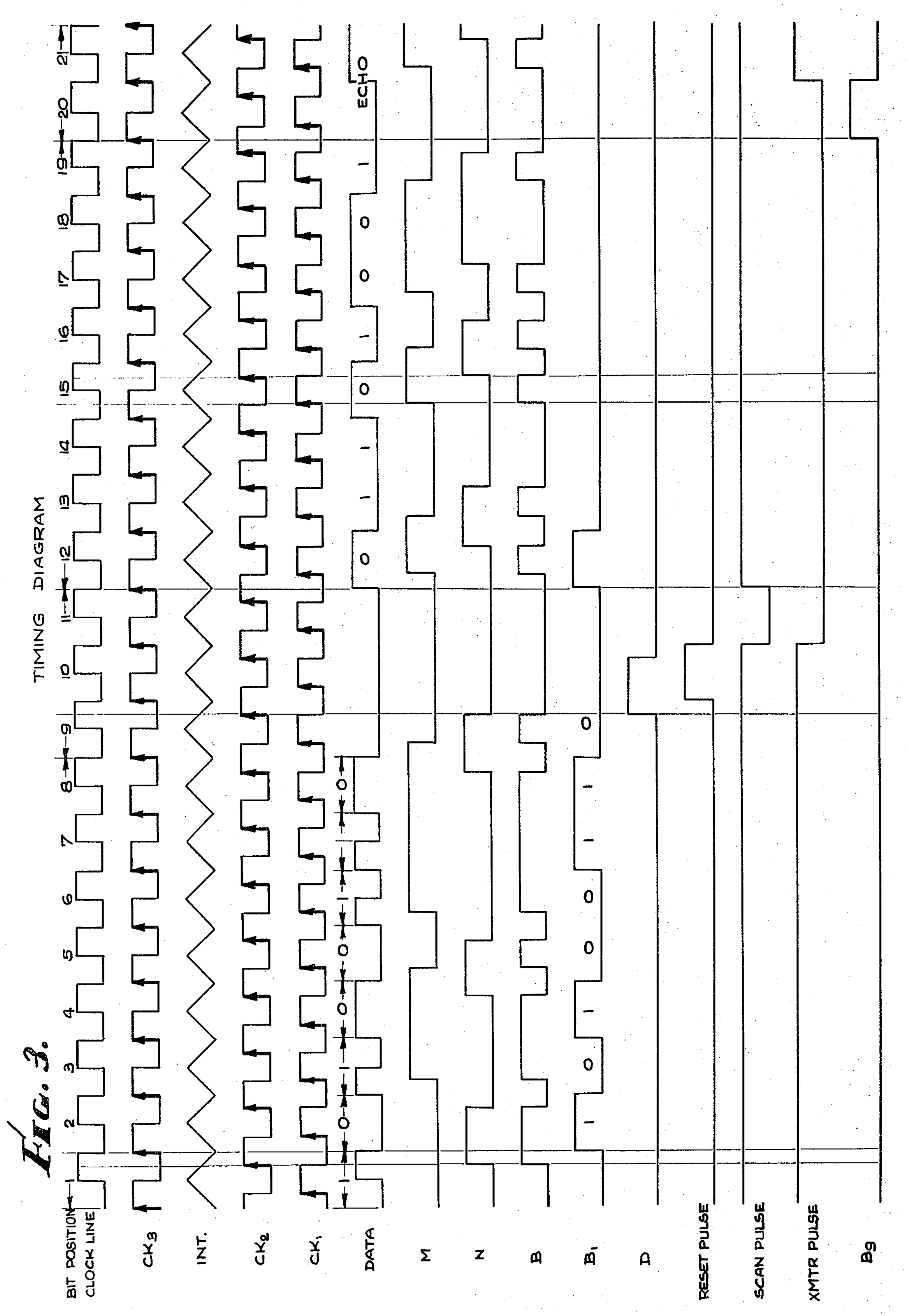
FIG. 3 is a timing diagram for FIG. 2.

As shown in FIG. 3, the inverter 30 changes states when its integrated input passes the halfway point between high and low as the capacitor 28 charges or discharges. The resistor 24 and diode 26 are needed in some instances to assure that the aforementioned halfway point occurs symmetrically in the middle of each pulse on the clock line 12. The CK2 line 32 is connected through an inverter 34 to produce a CK1 signal on a line 36. Accordingly, as shown in FIG. 3, the CK1 and CK2 signals are 180° out of phase with each other, with the CK2 signal 90° ahead and the CK1 signal 90° behind the CK3 signal.

As discussed in more detail hereinafter, each of the three phase clock lines 20, 32, and 36 is used with "sample and hold" logic circuit elements which sample their inputs during the initial portion of the clock pulses as shown by the bold faced arrows of FIG. 3. By using out-of-phase clock signals, the high or low status of various input circuits can be measured at different times, thus enabling the remote terminal to discriminate between binary address messages and binary response messages being carried on the same data line 10.

In order to provide a power supply at each remote terminal, a power converter line 38 passes through a diode 40 and a side-coupled capacitor 42 to smooth out the pulsating voltage on clock line 12 and produce a level supply voltage on a line 44, thereby providing the necessary power to each of the remote terminals for use by the active circuit elements therein.

The ground line 14 is connected as needed in the remote terminals to the various ground terminals of the logic circuit elements of FIG. 2.

The receiver-decoder circuit includes receiver-decoder lines 46 and 48 connected from the data line 10, flip-flops 50 and 52, two-input Nand gates 54 and 56, a three-input Nand gate 58, and a first portion 60 of an eight-bit shift register 62. Flip-flop 50 clocks the input line 46 by the CK2 line 32 with the two outputs connected, respectively, to Nand gates 54 and 56. In a somewhat opposite manner, flip-flop 52 clocks input line 48 by CK1 line 36 with its two outputs also connected to Nand gates 54, 56 so that each Nand gate has a Q input from one flip-flop and a $\overline{Q}$ input from the other flip-flop. The outputs of Nand gates 54 and 56 provide two inputs for the Nand gate 58, whose output at B is clocked by CK3 line 20 to produce an output at B1.

The critical points of the remote terminal circuits already described, including the data line 10, the clock line 12, the out-of-phase clock lines 20, 32, 36, and points M, N, B, B1 of the receiver-decoder circuit are shown on the timing diagram of FIG. 3.

Figure 5:
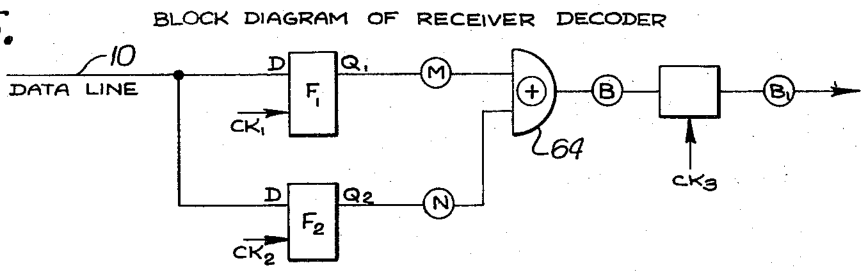
FIG. 5 is a block diagram for the receiver decoder of FIG. 2.

The operation of the receiver-decoder circuit is clarified by FIG. 5 showing a block diagram in which Nand gates 54, 56, and 58 are symbolically represented by an Exclusive Or gate 64 which produces an 0 output at B only when both inputs M and N are together high or together low. By clocking the output at B with the CK3 line 20, an output at B1 results only when a binary address message is received from the data line 10. In contrast, there is no output at B1 when a binary response message is received from the same data line 10.

The address detector circuit includes a four-input Nand gate 66 connected to the input of flip-flop 68 which is clocked by CK2 line 32 to produce a $\overline{Q}$ output identified by D on the timing diagram of FIG. 3. The four inputs to the Nand gate 66 are provided by the outputs of the shift register 60 which identify the address of this particular remote terminal in the illustrated instance the address 10100110 or its equivalent such as 01010011 being identified by outputs B1, B3, B6, B7.

In addition to providing the inputs for the address detector circuit, the shift register 60 in each remote input terminal in the monitoring configuration is time shared to serve as part of the input scanner circuit after a remote terminal has detected its own address. In such remote input terminals, each of the shift register outputs B1 through B8 is therefore connected through a resister 70 and diode 72 to line 74 having a side-coupled resistor 76. An exemplary normally open sensor 78 is connected on the B1 output line between the associated resistor 70 and diode 72 and an exemplary normally closed sensor 80 is shown connected to the B8 output line between its associated resistor 70 and diode 72. Similarly, normally closed or normally open sensors can be connected singly or in various circuit combinations to the output lines B2 through B7 to provide discrete input parameter points.

Figure 7:
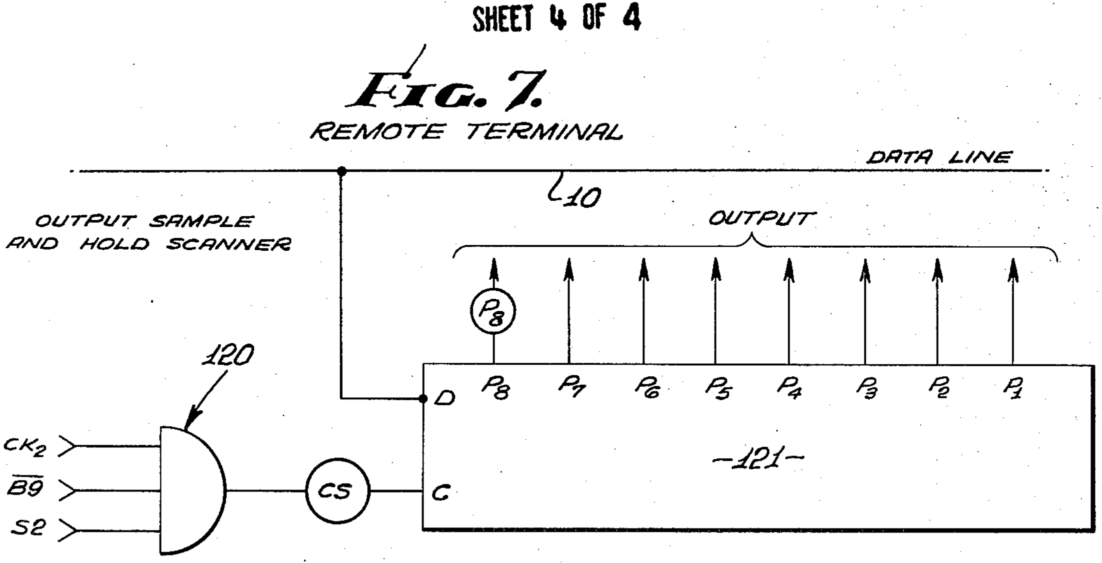
FIG. 7 is a circuit diagram of a portion of a remote output terminal of FIG. 1.
Figure 8:
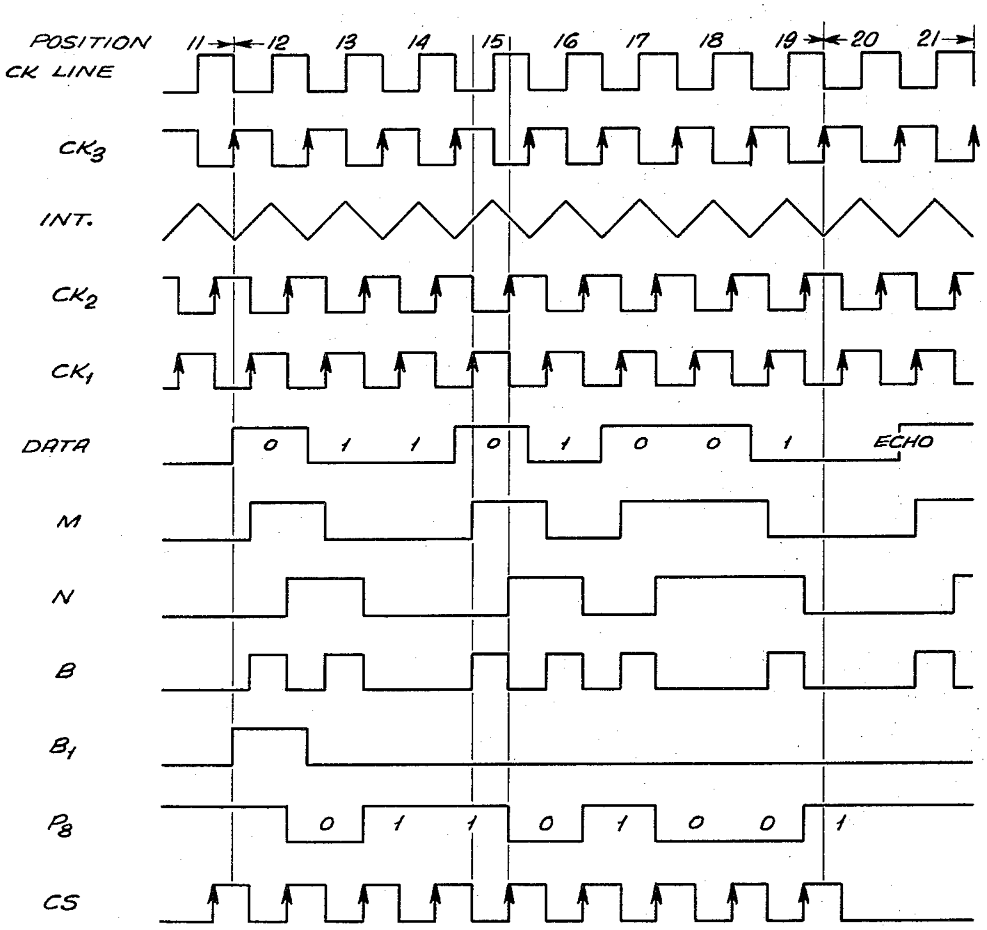
FIG. 8 is a timing diagram for FIG. 7.

In each remote output terminal in the controlling configuration, an output sample and hold scanner circuit such as the exemplary circuit shown in FIG. 7 is substituted in place of the input scanner circuits of the monitoring configuration. More specifically, an And gate 120 has CK2, $\overline{B9}$ and S2 as inputs and provides an output signal CS used to clock signals for a shift register 121 which samples and holds the response message transmitted by an identically addressed remote input terminal in the monitoring configuration. Consequently, after the completed transmission of a response message, the shift register output lines P8 through P1 hold the decoded status of the scanner input lines B1 through B8, respectively, of such identically addressed remote input terminal. As shown in FIG. 8, a closed input is decoded to a 0 state output and an open input is decoded to a 1 state output by the clock strobes CS in the selected remote output terminal of the controlling configuration.

An echo generator circuit includes a flip-flop 82 which has its input coupled from the B8 output of the shift register 62 and, in effect, combines with the shift register 62 to provide a nine bit shift register. The Q output of flip-flop 82 is identified as B9 and connects through its associated resistor 70 and diode 72 to the output line 74 without being connected to any input sensor. Both the eight bit shift register 60 and the flip-flop 82 are clocked by the CK3 line 20.

The output line 74 of the echo generator circuit extends through inverter 84 to become an input for a transmitter Nor gate 86 whose output connects through resistor 88 to a npn transistor 90 which is connected to the data line 10 for primary current flow to ground, thus inverting the signal received from the transmitter Nor gate 86. The inverter 84, transmitter Nor gate 86, resistor 88, and transistor 90 together constitute the transmitter circuit, with the other input for the transmitter Nor gate 86 being a transmitter pulse as described below.

Figure 4:
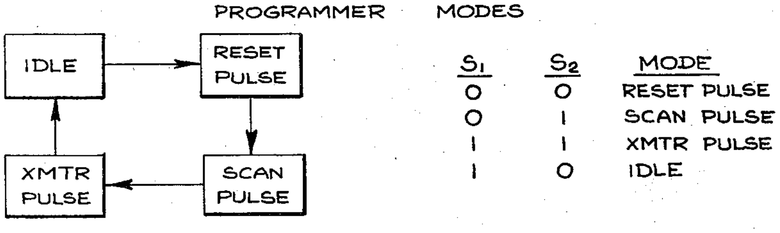
FIG. 4 shows the four modes of the programmer of FIG. 2.

The programmer circuit serves to move the remote terminal sequentially through four operating modes as shown in FIG. 4 and incorporates flip-flops 92, 94 both of which are clocked CK3 line 20. The combination of Q outputs from these two flip-flops 92, 94 is identified as S1 and S2 and together determine which operating mode the remote terminal is in. In this regard, flip-flop 92 which generates the S1 signal receives its input from a Nor gate 96 having one input D coming from the $\overline{Q}$ output of flip-flop 68 of the address detector circuit, and the other input coming from a reset pulse line 98. The reset pulse line 98 connects to shift register 62 and flip-flop 82 and carries a reset pulse produced by a Nor gate 100 having S2 as one input and S1 as the other. A scan pulse Nand gate 102 has $\overline{S1}$ as one input and S2 as the other, and connects through a scan pulse line 104 to provide the third input to Nand gate 58 in the receiver-decoder circuit. Flip-flop 94 which generates the S2 signal has a $\overline{Q}$ output which connects through a transmitter pulse line 106 to transmitter Nor gate 86. The input to flip-flop 94 is provided through Nor gate 108 having B9 as one input and the output from Nor gate 110 as the other. S2 provides one input to Nor gate 110 and $\overline{S1}$ provides the other.

During idle mode, no current flows through resistor 88 and transistor 90 is therefore in the off state. When the transmitter pulse initiates the transmitter mode, the high and low pulses from transmitter Nor gate 86 initiate corresponding pulsating current flow through transistor 90 to generate a binary response message on the data line 10.

In the exemplary form of the invention, the central station generates a binary coded address message biphase-mark waveform (biphase-M) in which there is a transition in the center of a bit cell only if the bit is a binary 1. Therefore, as shown with the exemplary binary address message 10100110 on the "data" portion of the timing diagram of FIG. 3, the presence or absence of a transition in the center indicates a 1 or 0, respectively. Biphase waveform as used herein refers to waveforms having at least one transition between 1 and 0 for each bit, in contrast to NRZ waveform such as the NRZ-level (NRZ–L) waveform as shown in the exemplary binary response message 01101001, also on the "data" portion of the timing diagram of FIG. 3, which for repeated bits stays at the same level.

As shown in FIG. 3, each bit of a binary address message in biphase-M waveform passing along data line 10 is received and decoded into NRZ–L waveform by the time it reaches B1. In contrast, although bits of a binary response message in NRZ–L waveform passing along data line 10 are sensed in one way or another at points M, N and/or B, the circuit at point B1 maintains a constant low as if there were no signal being transmitted on the data line 10. Thus, the receiver-decoder circuit at each remote terminal ignores binary response messages generated by itself or any other remote terminal, unless such remote terminal is a remote input terminal having an address identical to the addressed remote input terminal generating the response message, as previously described.

The scan pulse line 104 provides a 1 input to Nand gate 58 during the idling mode, thereby allowing the relative oscillations, of Nand gates 54, 56 to determine the input B into the shift register 62. However, such initial inputs to the shift register are for purposes of address detection rather than for use in scanning the parameter points bcoupled to the outputs of the shift register since a 1 input to transmitter Nor gate 86 effectively prevents any generation of binary response messages from the output line 74.

When the address is detected, however, a low output of Nand gate 66 produces a high at D, thereby initiating successively in the programmer circuit the reset pulse, scan pulse and transmitter pulse as shown in FIG. 7. The first CK3 pulse, after D goes high, initiates the reset pulse which clears all 1 bits from the outputs of the shift resistor 62 and flip-flop 82. The second CK3 pulse initiates the low scanning pulse. While the scanning pulse is low, the inherent circuit delays allow the cleared shift register 62 to sense a 1 at B at the third CK3 pulse, before the scanning pulse goes high as a result of the same third CK3 pulse. The resulting 1 produced at B1 can then be shifted through the cleared shift register 62. This shifting causes the various parameter points to be scanned sequentially such that a closed sensor 78 or 80 short-circuits the scanning pulse successively produced at B1–B8 outputs of the shift register 62 to generate a binary 1 in NRZ-L waveform on the data line 10, while an open sensor 78 or 80 allows the 1 pulse to proceed down output line 74 to generate a binary 0 in NRZ–L waveform on the data line 10.

Figure 6:
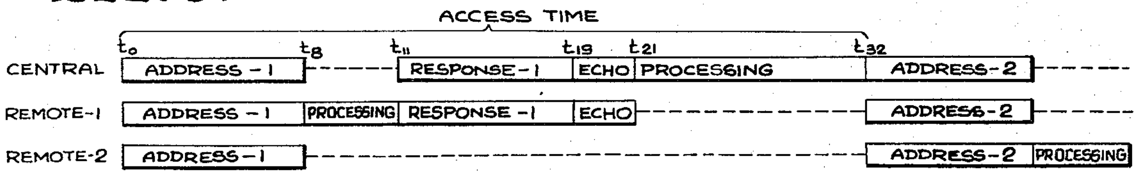
FIG. 6 is a timing diagram showing the sequence of message transmission between the central station and remote input terminals of FIG. 1.

The access time in the preferred embodiment (see FIG. 6) is subdivided into increments of time determined by the frequency of the clock signal of line 12. Thus, the exemplary eight bit binary address message transmitted by the central station is received by all of the remote terminals about the same time for purposes of address detection. The addressed remote terminal uses the next three bits to actually detect the address and pass through the reset pulse mode and scan pulse mode so that by the twelfth bit the addressed remote terminal is in the transmitter pulse mode for transmitting a binary response message back to the central station and/or to an identically addressed remote output terminal.

The B9 output of the flip-flop 82 generates a two bit frame of binary 10 at the end of the binary response message which is identified as the "echo code" on FIG. 3 to verify to the central station that the transmission cable is not damaged, such as being shorted or open, and also to verify that a remote terminal has responded. Because of the particular circuit elements employed at the central station in this embodiment, 11 bits are provided for processing of the binary response message at the central station before another binary address message is generated. The data line 10 therefore provides time-shared transmission of binary messages between the central station and also between remote terminals. The use of an address code based on the relative positioning of 1 bits enables time-shared use of the shift register 62 for address detection and input scanning. In the preferred embodiment, this address depends on the relative positioning of four 1 bits in any eight-bit combination, since the shift register takes eight-bit views of the entire stream of data coming from the central station.

Although the invention can be incorporated in a variety of commercial data acquisition systems, the preferred embodiment disclosed herein has been found to be particularly useful in a system having 32 remote terminals each serving eight discrete parameter points making a total of 256 available parameter points that can be monitored or controlled by the central station in combination with the remote input and output terminals. A basic bit rate of two kilobits per second is provided to achieve fast access time of 16 milliseconds per 8 parameter points. It is therefore possible in such a system to monitor the entire 256 discrete input points in the 32 remote terminals in about 500 milliseconds, thereby scanning all available points at least twice per second. Moreover, by utilizing complementary symmetrical metal oxide silicon semiconductors (COS/MOS) as circuit elements in the remote terminals which are capable of operating over a range of 1.5 to 15 volts, it is possible to provide transmission lines of more than 5,000 feet without hampering the accuracy and interference-free operation of the system.

Although an exemplary embodiment has been disclosed and discussed, it will be understood that other applications of the invention are possible and that the embodiment disclosed may be subjected to various additional changes, modifications and substitutions without necessarily departing from the spirit of the invention.

We claim as our invention:

1. Apparatus for time division multiplex data transmission between a plurality of remote terminals and a central station, including in combination:

central generating means in said central station for generating different binary address messages each identifying at least one remote terminal and being generated in a first encoded binary waveform;

remote generating means in each of said remote terminals for generating binary response messages upon receipt of their own binary address message, said binary response messages being generated in a second encoded binary waveform different from said first encoded binary waveform;

transmission means for connecting said central station independently with each of said remote terminals including a single data line simultaneously carrying said binary address messages to all of said remote terminals and carrying said binary response messages to said central station; and discriminator means in each of said remote terminals including a plurality of clock signals which are out of phase relative to each other for differentiating between said first encoded waveform of said binary address messages coming from said central generating means in said central station and said second encoded waveform of said binary response messages coming from said remote generating means in said remote terminals, respectively.

2. The apparatus of claim 1 including means in said central station for generating a clock signal corresponding to said binary address message, and wherein said transmission means includes a clock line separate from said data line, said clock line carrying said clock signal to said remote terminals to enable synchronous circuit operation at said remote terminals and to generate said plurality of out-of-phase clock signals.

3. The apparatus of claim 2 including means in each of said remote terminals connected to said clock line of said transmission means for converting said clock signal into a direct current power supply for logic circuit components in said remote terminals.

4. The apparatus of claim 2 including a phase clock generator in each of said remote terminals connected to said clock line of said transmission means for generating three out-of-phase clock signals, and remote receiver circuit means in each of said remote terminals connected to said data line and coupled to said phase clock generator for monitoring said data line to detect only binary messages in said first encoded waveform and to ignore binary messages in said second encoded waveform.

5. The apparatus of claim 1 including at least one remote terminal identified by a predetermined address and having circuit means connected to said data line for monitoring said data line to detect and receive binary response messages in said second encoded waveform generated by another remote terminal identified by the same predetermined address.

6. The apparatus of claim 1 including a single time-shared shift register means in each remote terminal and connected to said discriminator means and said remote generator means for identifying each remote terminal's own binary address message, and for thereafter scanning the status of a plurality of parameter points to obtain information for encoding into said binary response message.

7. Apparatus for time-division multiplex data transmission between a plurality of remote terminals and a central station as well as between certain of said remote terminals, including in combination:

central generating means in said central station for generating binary address messages each identifying at least one remote terminal and being generated in a first encoded binary waveform and for generating a corresponding clock signal;

remote receiving means in all of said remote terminals for detecting only binary address messages in said first encoded waveform;

remote generating means in certain of said remote terminals for generating binary response messages upon receipt of their own binary address message, said binary response messages being generated in a second encoded binary waveform different from said first encoded binary waveform;

remote response receiving means in certain of said remote terminals for detecting binary response messages in said second encoded waveform as generated by an identically addressed remote terminal;

transmission means for connecting said central station with said remote terminals including a clock line for carrying said clock signal to said remote terminals to enable synchronous circuit operation at said remote terminals, and a data line for carrying said binary address messages to said remote terminals and for carrying said binary response messages to said central station and to said other remote terminals.

8. A method of data transmission by time-division multiplexing between a central station and a plurality of remote terminals each identified by a predetermined binary address including the steps of:

generating a binary address message and a corresponding clock signal at the central station;

transmitting the binary address message simultaneously to all of the remote terminals in a first pulse-coded binary waveform;

transmitting the clock signal to all of the remote terminals;

converting the incoming clock signal at each of the remote terminals into a plurality of out-of-phase clock signals;

sensing the status of a plurality of parameter points in at least one of the addressed remote terminals;

generating a binary response message identifying the status of the parameter points at the addressed remote terminal;

transmitting the binary response message in a second pulse-coded binary waveform different from said first pulse-coded binary waveform to the central station and to each of the remote terminals; and using the out-of-phase clock signals to enable each remote terminal to distinguish between the first and second pulse-coded binary waveforms.

9. The method of claim 8 wherein said transmitting of the binary address message and the binary response message includes time-sharing a common line independently connecting the central station with each of the remote terminals and independently connecting the remote terminals to each other.

10. The method of claim 8 wherein said last-mentioned transmitting step includes transmitting from the addressed remote terminal to the central station a verification frame as a terminal and independent portion of the binary response message.

11. The method of claim 8 wherein said first-mentioned generating step includes generating a random sequence of binary address messages for transmission to the remote terminals, each binary address message being generated after the central station has received the previous binary response message, and including continuously monitoring the random sequence of binary address messages at each of the remote terminals.

12. The method of claim 8 wherein said first-mentioned generating step includes encoding the binary address message into a biphase waveform and said last-mentioned generating step includes encoding the binary response message into a NRZ waveform.

13. The method of claim 8 wherein said sensing step includes time-sharing a single shift register at the addressed remote terminal for both detecting the binary address message and sequentially scanning the status of each of a plurality of parameter points at the addressed terminal.

14. The method of claim 8 wherein said last-mentioned using step includes using the out-of-phase clock signals to detect and receive the binary response message in at least one other identically addressed remote terminal.

15. A method of data transmission between a central station and a plurality of remote terminals including the steps of:

generating at the central station a binary address message in a waveform discernible by the remote terminals;

time-sharing a shift register at the remote terminals to detect the binary address message and to sequentially scan the status of a plurality of parameter points at the addressed terminal;

generating at the addressed terminal a binary response message identifying the status of the parameter points and in a waveform not discernible by the remote terminals;

carrying the binary address message and binary response messages on a single time-shared data line;

transmitting a clock signal to the remote terminals;

converting the incoming clock signal at the remote terminals into a first clock signal, a second clock signal phase shifted 90° relative to the first clock signal, and a third clock signal phase shifted 90° in the same direction relative to the second clock signal; and applying the three out-of-phase clock signals to the binary address message and the binary response message to differentiate between their respective waveforms.

16. Apparatus for transmitting binary data between a central station and a plurality of remote terminals including:

a first time-shared transmission line connecting said central station with said remote terminals for carrying both binary address messages sent from the central station to the remote terminals and binary response messages sent from the remote terminals to the central station;

a second transmission line separate from said first transmission line, connecting said central station with said remote terminals for carrying a clock signal corresponding to said binary address messages to said remote terminals; and reception means at each of said remote terminals and connected to said first transmission line for detecting said binary address messages and for ignoring said binary response messages, said reception means including clock means coupled to said second transmission for generating three out-of-phase clock signals.

17. The apparatus of claim 16 including a third ground line, separate from said first and second transmission lines, connecting said central station with said remote terminals.

18. The apparatus of claim 16 wherein said reception means at certain of said remote terminals includes circuit means for detecting and receiving binary response messages generated by an identically addressed remote terminal.

* * * * *